United States Patent

[11] 3,558,883

[72] Inventors Robert W. Bench
 Chatham;
 Arthur M. Feibush, Westfield;
 Carl T. Schubauer, Middlesex, N.J.
[21] Appl. No. 735,329
[22] Filed June 7, 1968
[45] Patented Jan. 26, 1971
[73] Assignee the United States of America, as represented by the Secretary of the Air Force

[54] COUNTER FOR CONDENSIBLE RADIOACTIVE GASES
 1 Claim, 3 Drawing Figs.
[52] U.S. Cl. ................................................ 250/83, 250/43.5
[51] Int. Cl. ................................................ G01t 1/16
[50] Field of Search ...................................... 250/43.5R, 83

[56] References Cited
UNITED STATES PATENTS
3,458,701 7/1969 Schell ........................ 250/83

Primary Examiner—Archie R. Borchelt
Attorneys—Harry A. Herbert, Jr. and Ruth G. Codier ABSTRACT: A system for measuring the radiation emitted from a condensible radioactive gas. A specimen of the gas to be measured is introduced into a vacuumtight environment which also contains the detector for making the measurements. A cold spot is produced in proximity to the detector and a portion of the gas is condensed thereon, and measured in condensed state. A Dewar flask containing liquid nitrogen or other suitable refrigerant provides the cooling medium for producing the cold spot. Various arrangements of the cold spot vacuum chamber and the sample chamber in their relation to the Dewar flask are shown. Modifications of the basic idea deal with the location of the sample chamber and the cold spot vacuum chamber relative to the Dewar flask.

PATENTED JAN 26 1971

INVENTORS
ROBERT W. BENCH
ARTHUR M. FEIBUSH
BY CARL T. SCHUBAUER
Harry A. Herbert Jr
Ruth G. Codiss and
ATTORNEYS

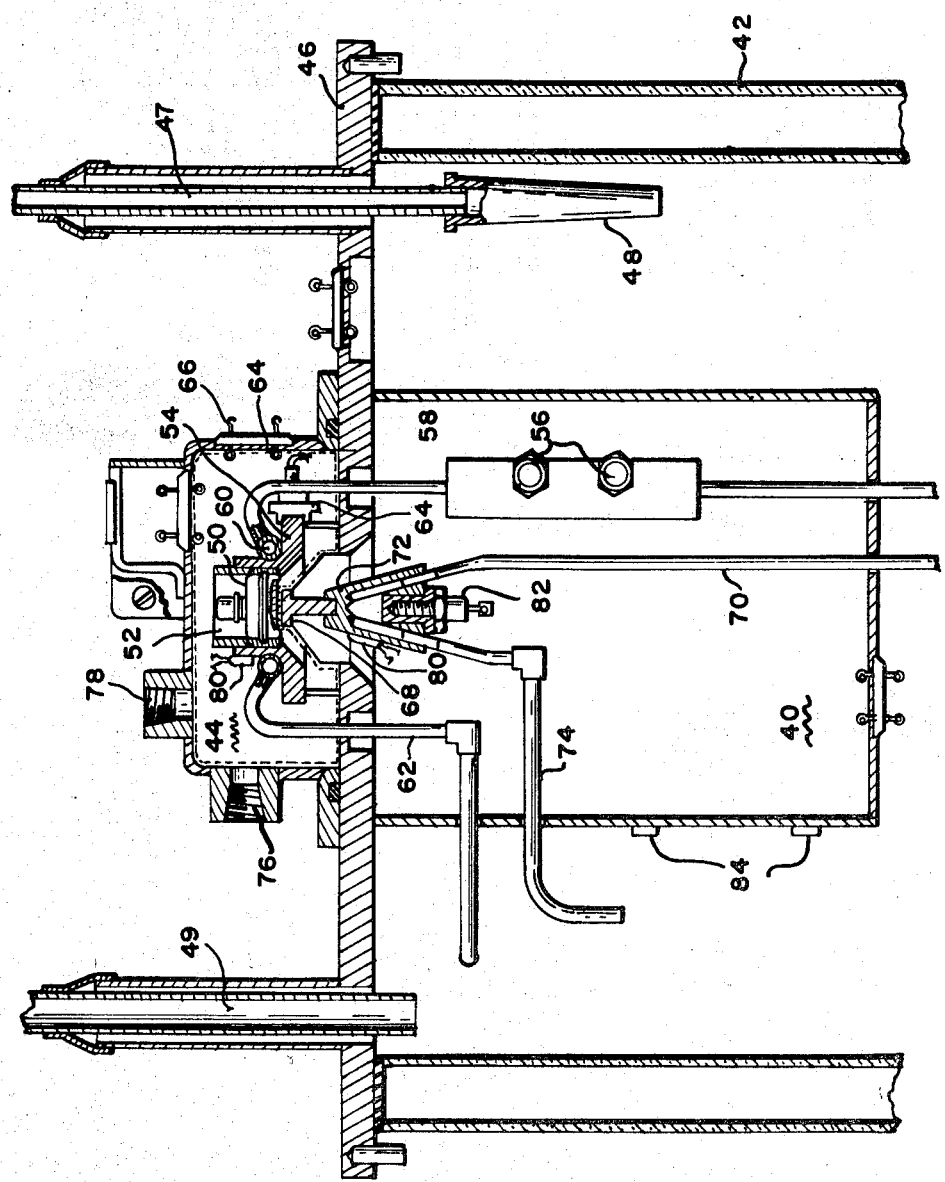

COUNTER FOR CONDENSIBLE RADIOACTIVE GASES

BACKGROUND OF THE INVENTION

This invention relates generally to measurement of radiation emitted from a condensible radioactive gas, and more particularly to an apparatus in which a sample of gas can be maintained in a thin disc in a position opposite to the face of a semiconductor detector.

Difficulties have been encountered where attempts have been made to measure radioactivity of gases. In the processes and equipment now available, contamination of the radioactive gases being measured is very difficult to avoid. The cause of this contamination generally is contact with other media occurring in systems where other gases or liquids are part of the measuring device.

SUMMARY OF THE INVENTION

The present invention provides a counter for condensible radioactive gases with an environment wherein the specimen to be measured is condensed and its radioactivity is measured by a solid state detector.

The object of the invention is to provide a device for the measurement of radioactivity in gases wherein the gas being measured is kept in a pure and uncontaminated state made possible by the device and the process. The gas can furthermore be withdrawn from the system stored and used again without danger of contamination by any foreign substances.

A further object of the invention is the provision of a device capable of identifying radioactive isotopes.

A still further object of the invention is the identification and quantitative determination wherein standard pulse height analysis techniques may be employed.

A further object of the invention is a provision of a device wherein a sample of gas can be introduced, without contamination, into a chamber, condensed therein on a cold spot to form a disc whose position is opposite to the face of a semiconductor solid state detector.

A still further object of the invention is the provision of a device as described above wherein the entire assembly is vacuum tight, as well as demountable.

A further object of the invention is the provision of effective arrangements of solid-state detector, cold spot disc and the arrangement of the refrigerant for effective cooling.

A still further object of the invention is to provide, in the area above described, a common wall between the specimen chamber and the chamber containing the refrigerant.

These and other advantages, features and objects of the invention will become more apparent from the following description taken in connection with the illustrative embodiments in the accompanying drawings, wherein:

DESCRIPTION OF THE DRAWINGS

FIG. 3 is a further modification showing refinements of the device.

DESCRIPTION OF ONE EMBODIMENT

Figure 1:
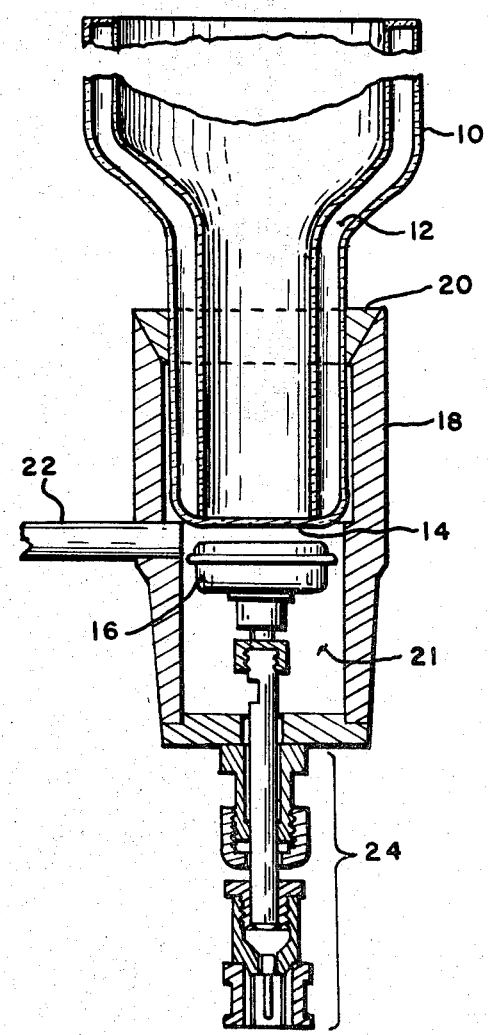
FIG. 1 is a cross-sectional view of the system as originally constructed.

Referring more in detail to FIG. 1 of the drawing, a glass Dewar vessel 10 has a lower reduced portion 12 terminating in a single-walled flat glass plate 14 which is cooled by liquid nitrogen or other coolant contained in the vessel 10, and becomes the cold spot disc for gas condensation into solid form.

A solid-state radiation detector such as a lithium-drifted silicon or germanium wafer 16 is mounted beneath the single-wall plate 14 in a mounting 18 which provides a chamber 21 capable of being maintained at a high vacuum. The vacuum-tight mounting 18 contains the lower portion 12 of the Dewar vessel 10, the contact being a compression fitting 20.

The radioactive gas whose emitted radiation is to be measured is admitted to the chamber 21 in the vacuumtight vessel or mounting 18, the side arm 22 being connected to a suitable vacuum pumping means.

The detector 16 is provided with suitable electrical connections 24. The arrangement is such that detector 16 can be maintained in a high vacuum within the chamber 18, while it is at the same time connected electrically to other equipment maintained in ordinary atmosphere. The unit indicated at 24 performs this function and also provides the inlet for the gas to be measured. It is, of course, lead into the chamber by compression fittings.

Figure 2:
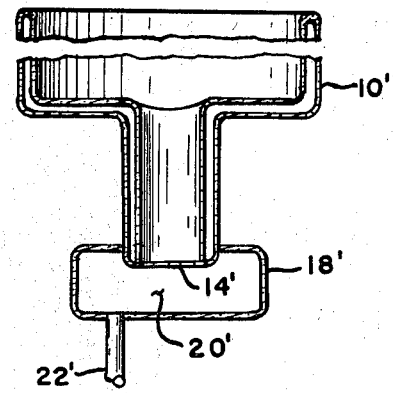
FIG. 2 is a cross-sectional view of a modification of the device of FIG. 1.

The form of the Dewar flask and the arrangement of the vacuum chamber and its outlet may be modified as the use of the device dictates. FIG. 2 is a schematic showing of such a modification. The gas inlet 22' is located at the base of the vessel 18'.

The counter is operated as follows: The components are assembled and positioned as desired. The assembly is evacuated through the side arm 22 and the radioactive gas is admitted through assembly 24 and condensed on the bottom disc portion 14 of the Dewar vessel 10 by filling the latter with suitable refrigerant. The solid-state radiation detector 16 is then used in the conventional way to measure the emitted radiation to which it is exposed. The gas may be expanded and recondensed as often as desired without adulteration, and may readily be recovered in the pure state by transfer to another container.

DESCRIPTION OF ANOTHER EMBODIMENT

Later developments have produced still further refinements of the device. Referring to FIG. 3, the cold spot vacuum chamber 40 is located inside the Dewar flask 42 instead of being located below it, as in the embodiments shown in FIGS. 1 and 2, and the sample chamber 44 is located on an element 46 which forms a top closure for the flask 42. Liquid nitrogen is admitted to the flask through inlet and outlet 47 and 49, respectively, with filter element 48 provided when needed. Outlet 49 is provided for purging the device. A detector 50 is mounted in a detector housing 52 which is itself mounted on a detector heat sink 54. Liquid nitrogen is admitted from a pump (not shown) or from the Dewar flask, is heated to suitable temperatures by the heaters 56, is conveyed to, around and away from the heat sink by ducts 58, 60 and 62, and lead back into the Dewar flask 42. The environment of the detector is thus carefully regulated by this means and by heaters 64 and thermometers 66.

A quantity of the gas within the sample chamber condenses on the cold spot disc 68, which forms a portion of common wall between the sample chamber 44 and the cold spot vacuum chamber 40. The condensation is effected by liquid nitrogen being pumped through the inlet 70 to provide cooling for the element 72 attached to the disc 68, and is withdrawn through outlet 74 and delivered back to the Dewar flask.

The gas to be measured is admitted to the sample chamber 44 through inlet 76, after a high vacuum has been obtained for insuring the purity of the specimen. A Hastings gauge 78 or equal provides for measurement of the pressure within the sample chamber.

The device of FIG. 3 operates in principle the same as the simpler device of FIG. 1. The components are assembled and positioned as desired. The sample chamber 20 of FIG. 1 and 44 of FIG. 3 are evacuated. The radioactive gas whose measurement is to be made is admitted. Condensation of a portion of the sample then takes place on the cold spot disc, 14 in FIG. 1 and 68 of FIG. 3. The disc in each case has been brought to a temperature sufficiently low to cause this condensation by means in each case which have been described. The solid-state radiation detector then measures the radiation emitted from the condensed sample.

It will now be evident that there is no possibility of contamination and that the gas may be expanded and recondensed, transferred to other containing media as often as desired and without danger of contamination.

Although the invention has been described with reference to particular embodiments, it will be understood to those skilled in the art that the invention is capable of a variety of alternative embodiments within the spirit and scope of the appended claims. For example, the embodiment of FIG. 3 may be provided with additional thermometers or thermostats 80 and heater 82 for additional environmental control of the apparatus. Additionally, liquid level sensors 84 may be provided.

We claim:

1. A device for measurement of radioactivity in radioactive gases, said device comprising a vacuum chamber for introduction and containment in pure form of the gas to be measured, a solid state radiation detector located in said vacuum chamber, a refrigerant chamber in the form of a Dewar flask, said refrigerant chamber and said vacuum chamber having a wall segment in common, said wall segment comprising a cold spot disc, exposed directly to the refrigerant in said refrigerant chamber, whereby a portion of the gas in said vacuum chamber is cooled by said refrigerant and condensed to a solid state, and whereby the radioactivity thereof may be measured by said solid state radiation detector, said Dewar flask having inlet and outlet means for supplying a refrigerant gas to said flask, said refrigerant chamber being contained within said Dewar flask, means for conveying refrigerant from said Dewar flask to said refrigerant chamber and to the vicinity of said cold spot disc, and means for converting refrigerant from said Dewar flask to the vicinity of said radioactive detector in said vacuum chamber for providing a heat sink for said detector.